(12) United States Patent
Ober et al.

(10) Patent No.: US 6,373,579 B1
(45) Date of Patent: Apr. 16, 2002

(54) PORTABLE MEASUREMENT APPARATUS FOR DETERMINGING THE DIMENSIONS OF AN OBJECT AND ASSOCIATED METHOD

(75) Inventors: Lawrence Richard Ober, Pineville; Raymond Andrew Orr, Charlotte, both of NC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 09/320,357

(22) Filed: May 26, 1999

(51) Int. Cl.⁷ ............................ G01B 11/00; G01B 11/14
(52) U.S. Cl. .................. 356/627; 356/309; 250/559.38
(58) Field of Search ............................ 356/3.09, 379, 356/380, 381, 383, 627, 634, 635, 628, 629; 250/559.07, 559.38

(56) References Cited

U.S. PATENT DOCUMENTS

| | | |
|---|---|---|
| 2,956,472 A | 10/1960 | Hildebrand |
| 3,274,914 A | 9/1966 | Biedermann et al. |
| 3,687,556 A | 8/1972 | Price et al. |
| 4,268,167 A | 5/1981 | Alderman |
| 4,369,365 A | 1/1983 | Bedford et al. |
| 4,518,253 A | 5/1985 | Takahashi |
| 4,596,919 A | 6/1986 | Kremers et al. |
| 4,730,190 A | 3/1988 | Win et al. |
| 4,773,029 A * | 9/1988 | Claesson et al. ............. 356/380 |
| 4,788,441 A * | 11/1988 | Laskowski ................. 356/3.09 |
| 4,926,050 A | 5/1990 | Shemwell |
| 5,175,595 A | 12/1992 | Fukase |
| 5,331,118 A | 7/1994 | Jensen |
| 5,402,223 A | 3/1995 | Schlobohm et al. |
| 5,477,622 A | 12/1995 | Skalnik |
| 5,512,761 A | 4/1996 | Winkelmann |
| 5,528,517 A | 6/1996 | Løken |
| 5,656,799 A | 8/1997 | Ramsden et al. |
| 5,661,561 A * | 8/1997 | Wurz et al. ................. 356/380 |
| 5,672,815 A | 9/1997 | Prutu |
| 5,699,161 A * | 12/1997 | Woodworth ................ 356/379 |
| 5,719,678 A | 2/1998 | Reynolds et al. |
| 5,734,476 A | 3/1998 | Dlugos |
| 5,770,864 A | 6/1998 | Dlugos |
| 5,777,746 A | 7/1998 | Dlugos |
| 5,808,912 A | 9/1998 | Dlugos et al. |

(List continued on next page.)

FOREIGN PATENT DOCUMENTS

FR         2 495 797 A        6/1982

*Primary Examiner*—Richard A. Rosenberger
(74) *Attorney, Agent, or Firm*—Alston & Bird LLP

(57) ABSTRACT

The present invention provides an apparatus and method for determining the dimension of an object. The apparatus of the present invention includes a transmitter that is positioned at a first point of interest on an object. The transmitter transmits a scanning light beam rotated at a predetermined angular velocity. Located at a second point of interest on the object is a target. At least a portion of the target defines a first plane that reflects the scanning light beam as the scanning light beam traverses across the target. To receive the reflected signal from the target, the apparatus of the present invention further includes a receiver positioned at the first point of interest. Additionally, the apparatus of the present invention includes a processor for processing the reflected signal and determining the dimensions of the object. In operation, the scanning light beam scans the target, where the radius of the arc that the light beam traverses across the target defines the dimension of the object. To determine the radius of the arc, the apparatus of the present invention uses the known width of the target, the angular velocity of the scanning light beam, and the time required for the scanning light beam to traverse the target. In addition to determining a dimension of an object, the present invention also provides apparatus and method for calibrating the measurement system and determining when the system is in steady state operation.

43 Claims, 10 Drawing Sheets

U.S. PATENT DOCUMENTS

| | | | |
|---|---|---|---|
| 5,815,274 A | * 9/1998 | Dlugos | 356/379 |
| 5,831,220 A | 11/1998 | Ramsden et al. | |
| 5,841,541 A | 11/1998 | Dlugos | |
| 5,850,370 A | 12/1998 | Stringer et al. | |
| 5,864,404 A | * 1/1999 | Amorosi | 356/379 |
| 6,123,264 A | * 9/2000 | Li et al. | 235/472.01 |

* cited by examiner

PORTABLE MEASUREMENT APPARATUS FOR DETERMINGING THE DIMENSIONS OF AN OBJECT AND ASSOCIATED METHOD

FIELD OF THE INVENTION

The method and apparatus of the present invention relate generally to determining the dimensions of an object. More particularly, the apparatus and method of the present invention relate to determining the dimensions of an object using a target having a known dimension and a scanning light beam.

BACKGROUND OF THE INVENTION

A major concern in the freight shipment industry is the individual size of packages and how packages are integrated into a specific carrier container used in shipping. Specifically, packages are shipped by many different modes of transportation including tractor-trailers, air planes, ships, etc. Each of these forms of carrier transportation have capacity limits per shipment and may have different sized carrier containers. As the cost of shipping continues to rise, it becomes more important for freight carriers to evaluate the size of individual packages to determine how to best maximize shipment space in their individual carrier containers used for shipment of the packages.

For example, many manufacturing companies that produce a line of products attempt to standardize their packages and ship packages in bulk form such that capacity of the specific carrier container utilized can be maximized. Further, the cost for shipment can be more easily determined and minimized. Problems occur, however, when the freight carrier is involved with several different customers all of which have different sized packages that are to be integrated into one carrier container for shipment. In these instances, it is much more difficult to maximize utilization of the carrier container's capacity and keep shipping cost to a minimum. For this reason, systems have been designed that allow a freight carrier to determine the size of individual packages such that shipping decisions, as far as cost and capacity are concerned, can be made.

These conventional package measurement systems vary widely in design and implementation. For instance, some conventional systems are implemented in conveyor belt systems and take measurements of the dimensions of packages using infrared transmitters and sensors that are positioned on the conveyor belt and sense when a package is present. Based on the time it takes for the package to pass the infrared sensor and the speed of the conveyor belt, the system can determine the dimensions of the package. Other systems implement measurement boxes having known dimensions in which each individual package is placed. These measurement systems use light curtains, infrared transmitters and sensors, or sonic transmitters and transducers that sense the amount of the measurement box the package occupies to determine the dimensions of the package. Still further, other systems use a measurement box that has scales in an X, Y, and Z axis that are bar coded. The package to be measured is placed in the measurement box and bar code scanners read the bar codes associated with the portions of the scales that are visible at the edges of the box to determine the package's dimensions.

Although the above package measurement systems provide devices and methods for the determining the dimensions of a package, they do have some drawbacks. Specifically, many of these conventional measurement systems are mostly stationary and are not conducive to portability. They typically employ the use of conveyor belts, multiple sensors, or measurement boxes that are not easily transportable. These measurement systems can also be costly and may require an unacceptable amount of space for implementation. Portability of the measurement device, cost for implementation, and overall size of the measurement system, however, are important factors to be considered in the use of a package measurement device by a freight carrier.

Specifically, some freight carriers are engaged in the shipment of packages from private individuals and a large number of different companies on a non-bulk shipment basis. In many instances, the number of packages to be shipped per customer on any given day is typically a small quantity, and the carrier typically sends personnel to the customer's facility for pickup of packages or the customer will bring the packages to a regional office for shipment. Because the packages are typically not part of a bulk shipment, the individual packages may vary widely in size, and the freight carrier is usually not aware of the dimensions of any of the packages prior to pickup.

As discussed above, however, the overall size of the package may affect the cost of shipment. This creates a problem in that the cost of shipment of the package is usually negotiated at the time of pickup, not after the package has been later processed for shipment. Due to these factors, it is advantageous to measure the package at the pickup site such that the cost associated with the package size can be added to the customer's bill. Additionally, it is advantageous to electronically store the dimensions of the package such that this information can be subsequently used to determine logistics for integrating the package with other packages into a carrier container for shipment.

Conventional systems, however, are typically not conducive to point of purchase measurement of the package such that the customer can be immediately charged for the size of the package to be shipped and the dimensions can be electronically stored. Specifically, in instances where the freight carrier picks up the package at the customer's facility, conventional measurement systems do not provide the portability needed to allow the freight carrier to quickly determine at the pick up point the dimensions of a package. Likewise, when packages are brought to a regional office by the customer, conventional measurement systems do not provide cheap, cost effective, and size manageable measurement devices. Although conventional conveyor belt or measurement box systems might be used in these instances, the cost and space needed to accommodate conventional conveyor belt measurement systems and the cost of sensors and materials needed for conventional measurement box systems can significantly increase shipping cost.

Because portability, space, and cost are a major concern, a portable measurement system is needed that allows the freight carrier to easily determine the dimensions of a package at point of pick up such that the cost associated with shipping of the package can be easily assessed to the customer and the package dimensions can be stored electronically such that the dimensions are readily accessible for later shipment decisions.

SUMMARY OF THE INVENTION

As set forth below, the method and apparatus of the present invention for measuring the dimensions of an object can overcome many of the deficiencies identified with conventional package dimension measurement systems. In particular, the method and apparatus of the present invention provides a portable measurement system that allows the user to quickly and easily take the measurements of a package. The method and apparatus of the present invention stores the dimensions of the package such that these dimensions may be used to determine the cost for shipping the package and also the space needed for integrating the package with other packages in a carrier container for shipment. In particular, the present invention provides a portable measurement system that requires a minimum number of components, is cost effective, and is miniaturized compared to many conventional measurement systems.

These and other advantages are provided, according to the present invention, by an apparatus for measuring at least one dimension of an object as represented by the distance between two points of interest associated with the object. The apparatus includes a transmitter that is positioned at a first point of interest on the object. The transmitter transmits a scanning light beam rotated at a predetermined angular velocity. Located at the second point of interest on the object is a target. At least a portion of the target defines a first plane that reflects the scanning light beam as the scamming light beam traverses across the target. To receive the reflected signal from the target, the apparatus of the present invention further includes a receiver positioned at the first point of interest. Additionally, the apparatus of the present invention includes a processor for processing the reflected signal and determining the dimensions of the object.

In operation, the transmitter transmits a scanning light beam rotated at a predetermined angular velocity. As the scanning light beam rotates, the light beam traverses across the target located at the second point of interest and the first plane of the target partially reflects the light beam back to the receiver. The receiver receives the reflected signal, and the processor determines the dimensions of the object by calculating the distance between the two points of interest.

In one embodiment of the present invention, the apparatus determines the dimension of the package based on a known width of the target, the angular velocity at which the transmitter rotates the scanning light beam, and the time required for the scanning light beam to traverse the known width of the target. Specifically, as the transmitter transmits the rotating scanning light beam, the rotation of the scanning light beam creates an arc of rotation, a portion of which traverses the known width of the target. In this embodiment, the radius of the arc of rotation of the scanning light beam defines the distance between the transmitter and the target. To determine the radius of the rotational arc (i.e., the distance between the transmitter and the target which is the dimension of the package), the apparatus further includes a counter connected to the receiver.

In operation, the transmitter transmits a scanning light beam rotated at a predetermined angular velocity. The scanning light beam traverses across the target and the first plane of the target reflects the scanning light beam. As the reflected signal is received by the receiver, the counter accumulates the time required for the scanning light beam to traverse the known width of the first plane of the target. Using the known width of the target, the angular velocity of the scanning light beam, and the time required for the scanning light beam to traverse the target, the processor determines the radius of the arc of rotation which corresponds to the dimension of the object.

As discussed above, the apparatus of the present invention includes a target having a first plane that at least partially reflects the scanning light beam. In some embodiments of the present invention, the first plane of the target includes at least two reflective transition points that are spaced apart at a known distance. In this embodiment, the scanning light beam traverses across the reflective transition points, and the receiver receives signals indicating when the scanning light beam traverses the reflective transition points. These received signals are used by the processor to determine the dimensions of the object.

Depending on the embodiment, the reflective transition points of the target of the present embodiment may take several forms. Specifically, in one embodiment of the present invention, the target includes a nonreflective portion surrounded by a reflective portion where the edges of the nonreflective portion defines the transition points (i.e., a black strip of known width superimposed on a white target). In another embodiment, the target includes a plurality of nonreflective portions spaced apart from each other by reflective portions having known widths.

In addition to providing an apparatus and method for determining the dimensions of an object, the present invention also provides an apparatus and method for first aligning the transmitter and the target prior to determining the dimension of the object. In some embodiments, it advantageous to align the center of the target with the center of the transmitter such that the scanning light beam properly scans the target. Specifically, in these embodiments, the transmitter rotates the light beam through a rotational arc. In order to obtain proper alignment between the target and the transmitter, it is advantageous to align the midpoint of the first plane of the target to the midpoint of the rotational arc of the scanning light beam.

To align the target and the transmitter, in one embodiment of the present invention, the transmitter includes an alignment mode. In the alignment mode, the transmitter initially provides a stationary light beam that intersects the midpoint of the rotational arc of the scanning light beam. Using this stationary light beam, the user can align the midpoint of the first plane of the target to the stationary light beam to thereby align the target and the transmitter. In some embodiments, of the present invention, the transmitter initially transmits the stationary light beam allowing the user to align the target to the transmitter, and after a predetermined period of time, begins to rotate the scanning light beam such that the dimensional measurement can be made.

The present invention also provides a method and apparatus for calibrating the measurement system. Specifically, as discussed above, the apparatus of the present invention includes several components used in operation to determine the dimensions of the object. As these components are subject to manufacturing tolerances, age drift, and temperature drift, there may be variations in the performance of the apparatus. Additionally, there may be measurement errors associated with differences between the plane of the target and the rotational arc of the scanning light beam. As such, in some embodiments, it may be advantageous to account for some of these errors.

To calibrate the measurement system, in one embodiment of the present invention, a target of known width is placed at a second point of interest that is a known distance from a first point of interest where the transmitter is located. The transmitter, in a calibration mode, scans the target with the scanning light beam at a plurality of different distances between the transmitter and the target. For each of the distances, the processor stores the distance and associated time for the scanning light beam to traverse the target in a table. In operation, after the apparatus has measured the time required for the scanning light bean to traverse the target, the processor accesses the table and using the measured time interpolates between the stored values (if it does not match one of the stored values) to determine the dimension of the object.

As mentioned above, the angular velocity at which the transmitter rotates the scanning light beam may be affected by changes in operating temperature. As such, either alternatively or in addition to the above calibration mode, the present invention also provides an apparatus and method for calibrating the measurement system to compensate for the effects of temperature on the performance of the measurement system. In this embodiment of the present invention, the apparatus further includes a temperature sensor connected to the processor. Additionally, the apparatus of the present invention also includes a memory device containing a stored table of temperature calibration data. In this embodiment of the present invention the apparatus in a calibration mode, is subjected to several different temperatures and calibrated at known distances. This calibration data for each temperature is stored. In operation, the sensor senses the operating temperature of the measurement system and supplies this information to the processor. The processor receives the operating temperature and accesses the calibration table in the memory device. The processor locates the correct calibration data associated with the sensed temperature and may either compensate the dimension measurement of the object with the calibration data or use the stored values to provide a temperature compensated measurement.

In addition to calibrating the measurement system to account for changes in the angular velocity of the scanning light beam, in some embodiments it is also advantageous to ensure that the transmitter has reached steady state operation prior to performing the dimension measurement. Specifically, when the measurement system is initially actuated, there may be some delay time prior to the transmitter transmitting the scanning light beam at predetermined angular velocity. To determine whether the transmitter has reached steady state, in one embodiment of the present invention, while the transmitter is transmitting the scanning light beam, the processor repeatedly samples the light beam reflected by the target and calculates the distance between the two points of interest. The processor further repeatedly compares the calculated distances to each other. When the calculated distances for each sample of the reflected light beam produces dimensional values that are relatively equal, the processor determines that the transmitter is in steady state operation. In an alternative embodiment, the processor eliminates from consideration an initial preset number of scans before performing the measurement.

As mentioned above, the transmitter and the receiver are located at the first point of interest on the object. In some embodiments, it is advantageous to incorporate the transmitter and receiver into a housing for portability and to protect the components from weather. Thus, in one embodiment of the present invention, the apparatus further includes a housing that has securing means for housing the transmitter and receiver. This housing provides a durable container to shield the transmitter, receiver, and other components from environmental elements and also to provide a portable, ergonomic package.

In embodiments where the transmitter and receiver are located in a housing, it may be advantageous to provide a reference point that will engage the first point of interest of the object and align the transmitter and receiver to the object. As such in one embodiment of the present invention, the housing further includes a reference point that engages with the first point of interest of the object to be measured. The reference point allows the measurement system to be placed consistently and reliably at the first point of interest of the object such that accurate measurements can be acquired. Additionally, the reference point may include an alignment means that maintains the scanning light beam perpendicular to the plane of the target.

In some embodiments of the present invention, the reference point may be placed in a location such that the transmitter and the first point of interest of the object are separated by an offset distance. In this embodiment, the offset distance between the reference point and the transmitter must be accounted for in the determination of the dimension of the object. Specifically, because the transmitter may be either closer or further away from the target than the first point of interest is to the target. In this instance, it is advantageous for the processor to compensate for the dimensional measurement for this offset distance. As such, in one embodiment of the present invention, the processor determines the distance between the first and second points of interest based on the light beam reflected from the target and either subtracts or adds the horizontal difference between the transmitter and the reference point on the housing to the dimension measurement.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides a method and apparatus for measuring the dimensions of an object. In particular, the method and apparatus of the present invention provides a portable measurement system that allows the user to quickly and easily obtain the measurements of a package. The method and apparatus of the present invention stores the dimensions of the package such that these dimensions may be used to determine the cost for shipping the package and also the space needed for integrating the package with other packages in a carrier container for shipment. Importantly, the present invention provides a portable measurement system that requires a minimum number of components, is cost effective, and is miniaturized compared to many conventional measurement systems.

Figure 1:
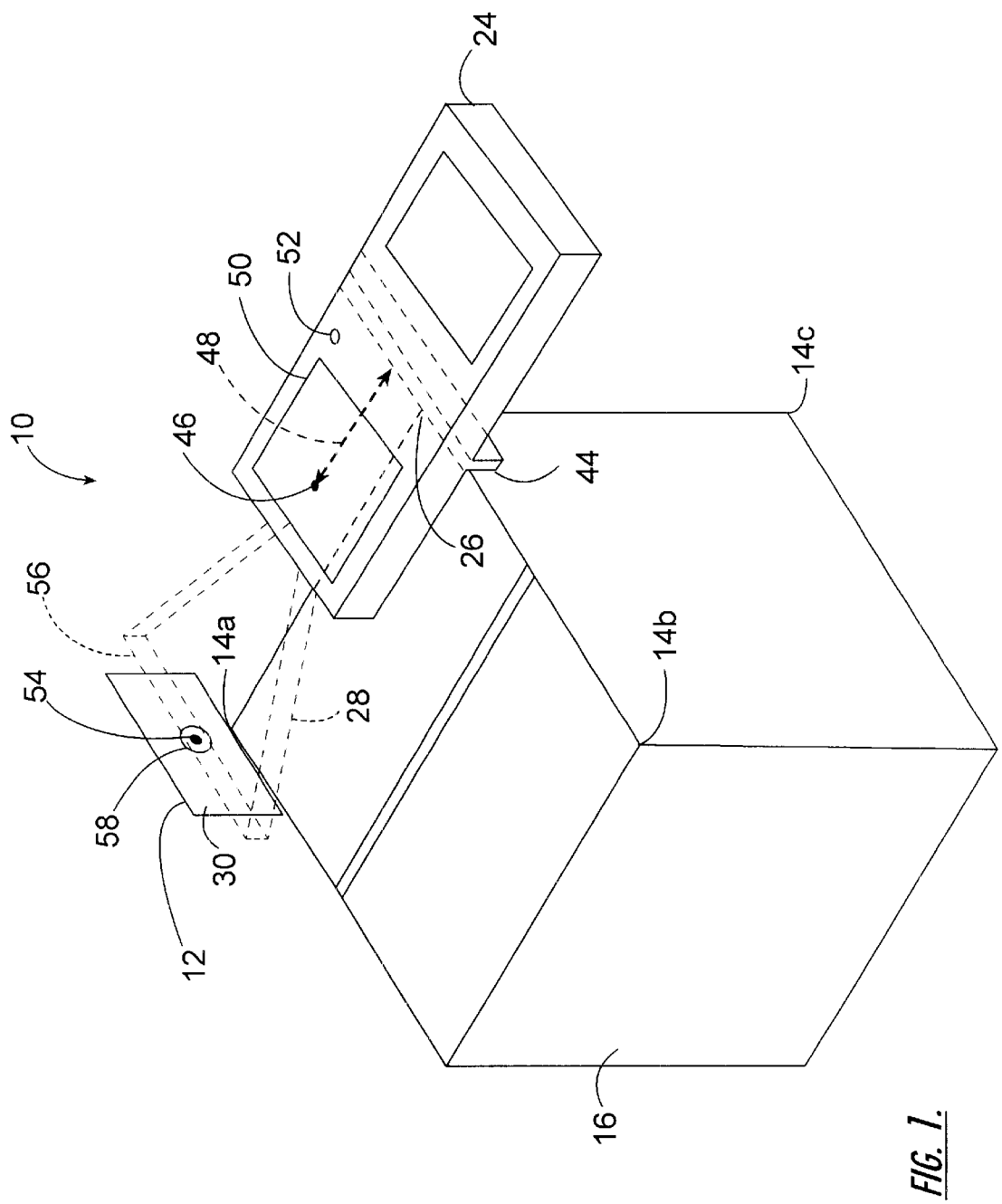
FIG. 1 is a three dimensional block diagram of the apparatus for determining the dimension of an object according to one embodiment of the present invention.

With reference to FIG. 1, a three dimensional illustration of one embodiment of the apparatus for determining the dimensions of an object is shown. As illustrated, the apparatus 10 of the present invention includes a target 12 located at a second point of interest 14 on an object 16. The target includes a first plane 30 that at least partially reflects a scanning light beam 28 as the scanning light beam traverses across the first plane of the target. In this particular embodiment, the apparatus further includes a housing 24 positioned at a first point of interest 26 on the object 16.

Figure 2:
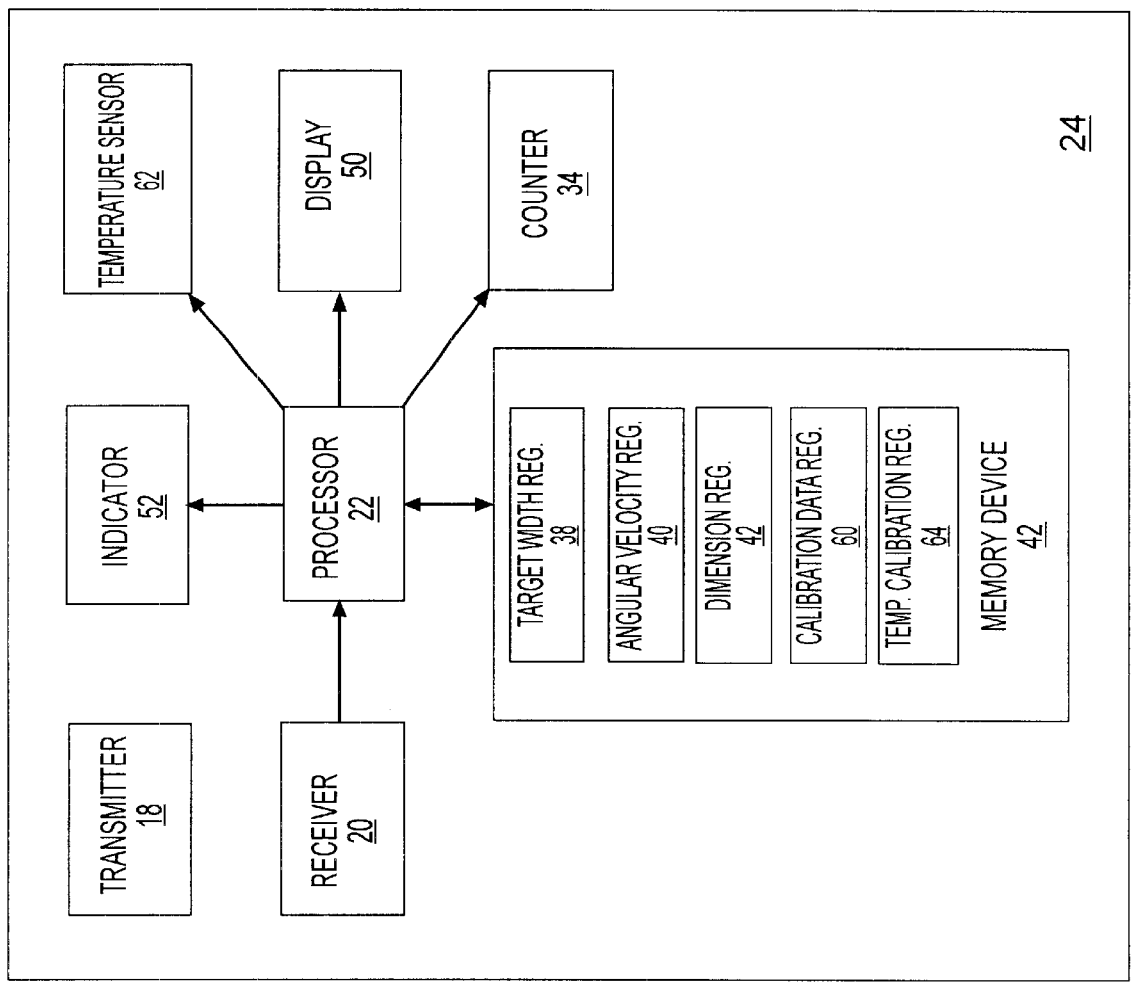
FIG. 2 is an block diagram of the apparatus for determining the dimension of an object according to one embodiment of the present invention.

With reference to FIGS. 1 and 2, the housing 24 includes a transmitter 18 that produces a scanning light beam 28, not shown, rotated at a predetermined angular velocity. The apparatus of the present invention further includes a receiver 20 for receiving signals reflected by the target. Connected to the receiver is a processor 22 that determines the dimensions of the object by calculating the distance between the two points of interest.

Figure 3:
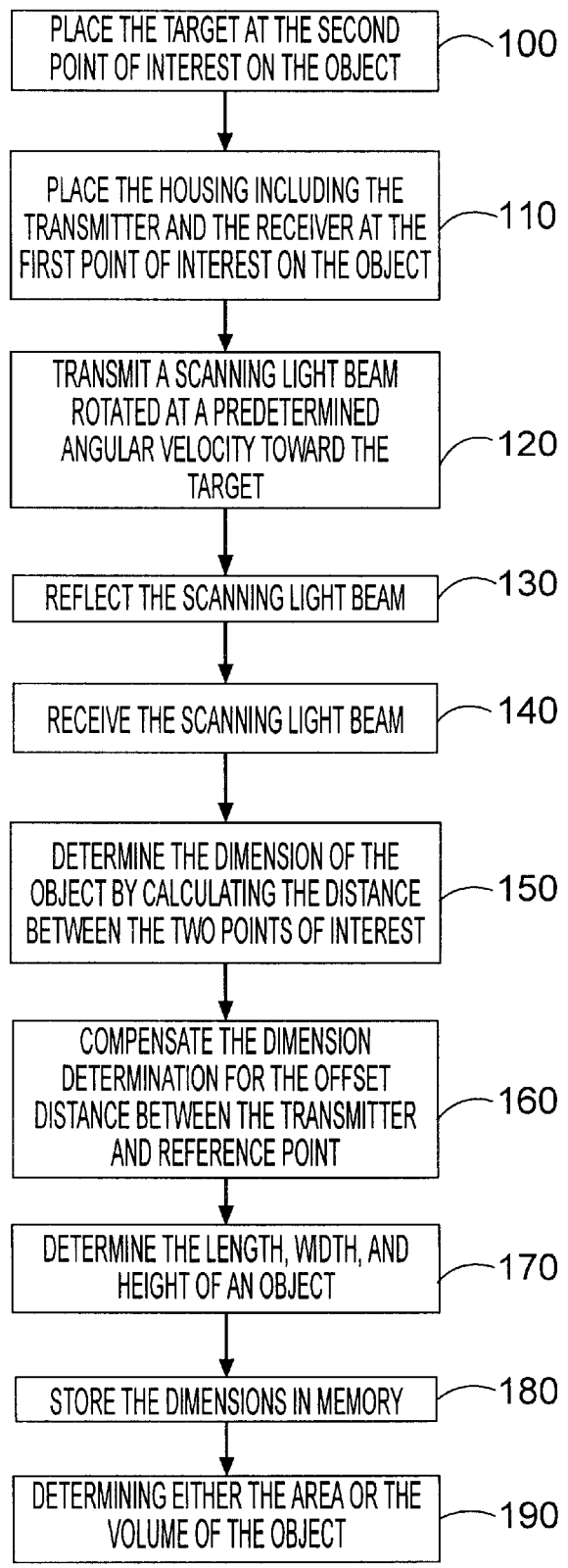
FIG. 3 is an operational block diagram of the operations performed for determining the dimension of an object according to one embodiment of the present invention.

With reference to FIG. 3, in operation, the target is initially placed at the second point of interest on the object. (See step 100). The housing including the transmitter and the receiver are positioned at the first point of interest on the object. (See step 110). The transmitter is next actuated and transmits a scanning light beam rotated at a predetermined angular velocity and directed toward the target. (See step 120). As the scanning light beam rotates, it traverses the target, and the first plane of the target at least partially reflects the scanning light beam. (See step 130). The reflected signal from the target is received by the receiver, (see step 140), and the processor determines the dimensions of the object by calculating the distance between the two points of interest. (See step 150).

Figure 4:
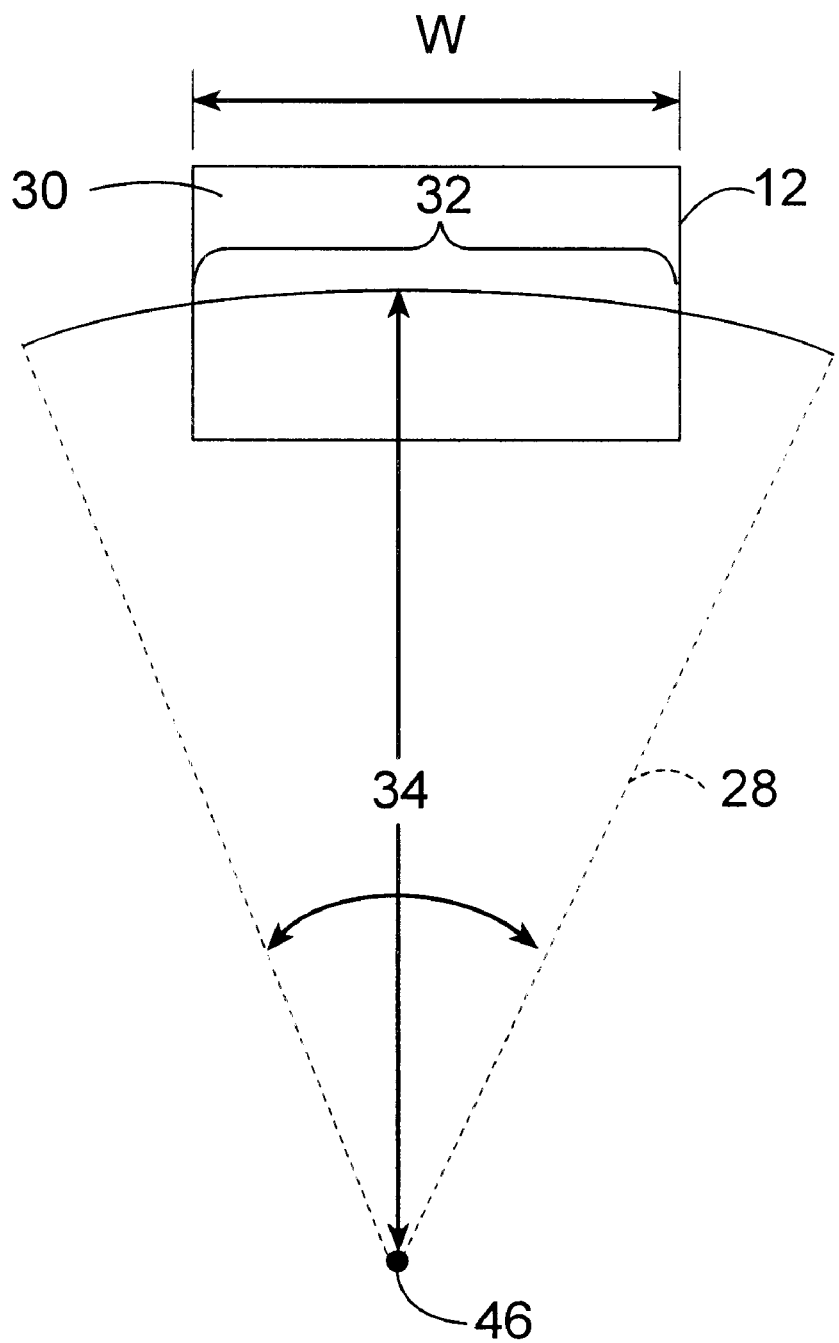
FIG. 4 is a graphic illustration of a scanning light beam transmitted by the apparatus of the present invention traversing the width of a target according to one embodiment of the present invention.

With reference to FIG. 4, the determination of the dimension of the object is illustrated. Specifically, as the scanning laser beam 28 rotates, it traverses the width W of the target 12 and creates a rotational arc 32. Importantly, the radius 34 of the rotational arc defines the distance between the transmitter 18 and the target 12. Thus, by determining the radius of the rotational arc, where the transmitter is located at a first point of interest on the object and the target is at the second point of interest, the dimension of the object can be determined.

To determine the radius of the rotational arc of the scanning light beam across the target, it is first realized that as the target is moved further away from the transmitter, the rotational arc across the target will become shorter and as the target is moved closer to the transmitter, the rotational arc across the target will become longer. Correspondingly, the time required for the scanning light beam to traverse the target will differ depending on the distance between the target and the transmitter. As such, the radius of the rotational arc, and thus, the dimension of the object, can be determined by knowing the width of the target, the angular velocity at which the transmitter rotates the scanning light beam, and the time required for the scanning light beam to traverse the target.

To determine the radius of the arc of rotation, the equation for the linear beam velocity can be used. Specifically, linear beam velocity of the scanning light beam can be expressed either in terms of the target width and time to scan the target or in terms of angular velocity and the circumference of the arc that the scanning light beam travels across the target.

Linear Beam Velocity=Target Width/Time to Scan Target or

Linear Bean Velocity=Angular Velocity X Circumference of the Arc

Since the above equations are both equal and the circumference of the arc is $2\pi R$, the equations can be set equal to each other:

Target Width/Time to Scan Target=Angular Velocity×2 $\pi$R and solving for R:

$$R = \frac{(\text{Target Width/Time to Scan Target})}{2\pi \times \text{Angular Velocity}}$$

As such, the radius of the rotational arc can be determined using the above equation.

With reference to the above equation, the target width and the angular velocity of the scanning light beam are predefined terms that are typically known prior performing the measurement of the object, however, the time to scan the target with the scanning light beam will vary depending on the distance between the transmitter and the target (i.e., the dimension of the object). Thus, before the radius of the rotational arc can be determined, the time to scan the target must be measured. With reference to FIG. 2, to measure the time required to scan the target, the apparatus of the present invention further includes a counter 34 connected to the receiver.

Figure 5:
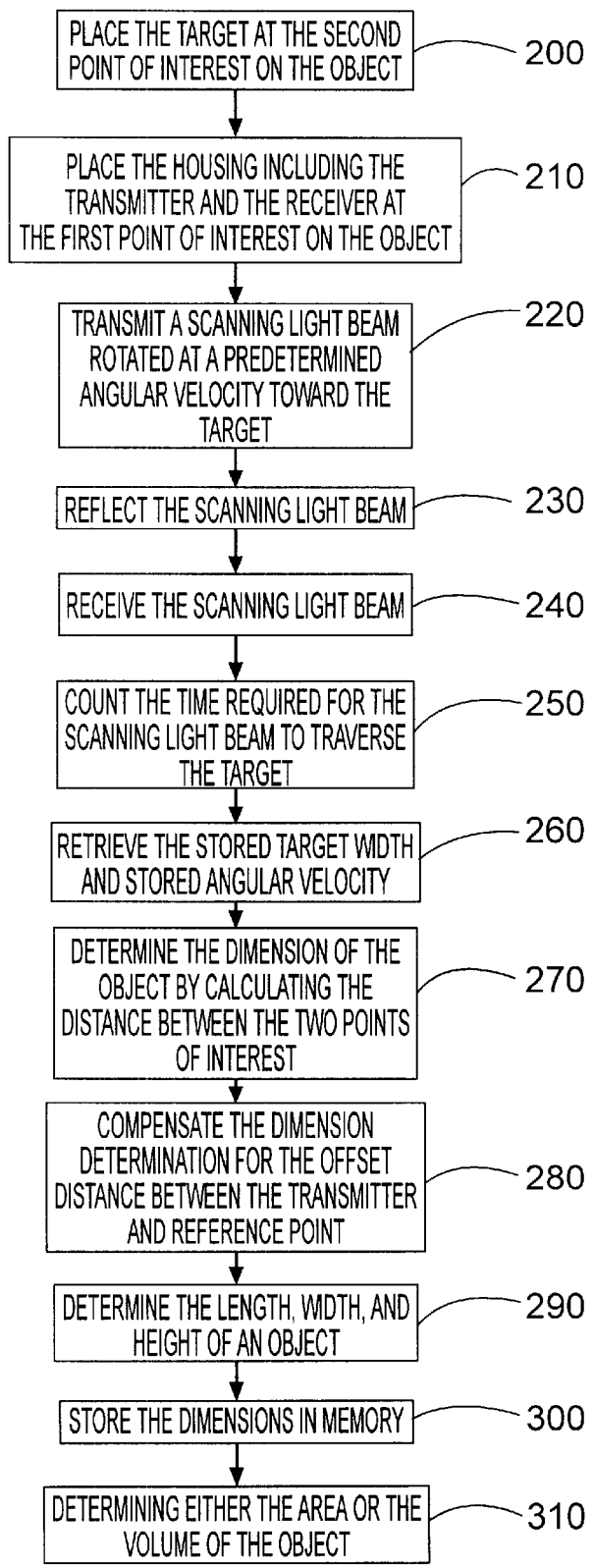
FIG. 5 is an operational block diagram of the operations performed for determining the dimension of an object using the known width of a target, the angular velocity of a scanning light beam, and the time required for a scanning light beam to traverse the width of a target according to one embodiment of the present invention.

With reference to FIG. 5, the operation of the apparatus of the present invention is illustrated. Specifically, in operation, the target is initially placed at the second point of interest on the object. (See step 200). The housing including the transmitter and the receiver are positioned at the first point of interest on the object. (See step 210). The transmitter is next actuated and transmits a scanning light beam rotated at a predetermined angular velocity and directed toward the target. (See step 220). As the scanning light beam rotates, it traverses the target, and the first plane of the target at least partially reflects the scanning light beam. (See step 230). The reflected signal from the target is received by the receiver. (See step 240).

As the reflected signal is received, the counter determines the period of the reflected signal by counting the time it takes for the scanning, light beam to traverse the target. (See step 250). The processor receives the count equaling the time required for the scanning light beam to traverse the target from the counter. The processor also accesses a memory device 36 connected to the processor and from a target width register 38 retrieves the stored target width and from a angular velocity register 40 retrieves the stored angular velocity at which the transmitter rotates the scanning light beam. (See step 260). Based on the width of the target, the angular velocity at which the transmitter rotates the scanning light beam, and the time required for the scanning light beam to traverse the target, the processor using the above equation determines the radius of the rotational arc, and thus, the dimension of the object. (See step 270).

To illustrate the determination of the rotational arc using the above equation, consider an example in which the width of the target is 2 inches, the angular velocity of the scanning light beam is 8 $\pi$ radians/second, and the measured time required for the scanning light to traverse the target is 1 millisecond. Using the above equation:

$$R = \frac{(2 \text{ inches}/.001 \text{ seconds})}{2\pi \times 8\pi \text{ radians/second}}$$

and

R=12.68 inches

Thus, the dimension of the object is 12.68 inches. It must be understood that this example is for illustration purposes only and does not limit the scope of the invention.

The apparatus and method of the present invention provides an accurate system for the measurement of objects. Specifically, in typical embodiments, the apparatus and method of the present invention determine dimensions of an object with a resolution of approximately ¼ inch. Typical embodiments of the present invention have an operating range of 0 to 72 inches with a preferable range of 4 to 50 inches. However, it must be understood that the operating range of the invention is a function of the sensitivity of the receiver, the power of the transmitter, and the characteristics of the target used, and as such, the apparatus of the present invention may be designed to determine a broad range of measurements depending on the receiver, transmitter, and target used.

Further, the present invention may have some associated minimal errors. Specifically, in some embodiments, the present invention determines the dimension of the object by determining the radius of the arc of rotation of the scanning light beam as it traverses across the target. In embodiments that use a flat rather than a curved target, the difference between the arc and the flat target may have some associated error. However, this is generally minimal compared to the typical ¼ inch resolution required by the apparatus.

Additionally, components used in many devices have manufacturing tolerances such that each component may have slightly different operating characteristics. For example, the transmitter of one unit may not have the same operating characteristics as another transmitter and likewise for the other components of the apparatus. Further, as components age, the operational parameters of the components may change. As such, in some embodiments, it is advantageous to calibrate each measurement system to ensure that the measurement system provides accurate determinations of the dimension of objects by compensating for component manufacturing tolerance, age drift, and differences between the flat plane of the target and the rotational arc.

Figure 6:
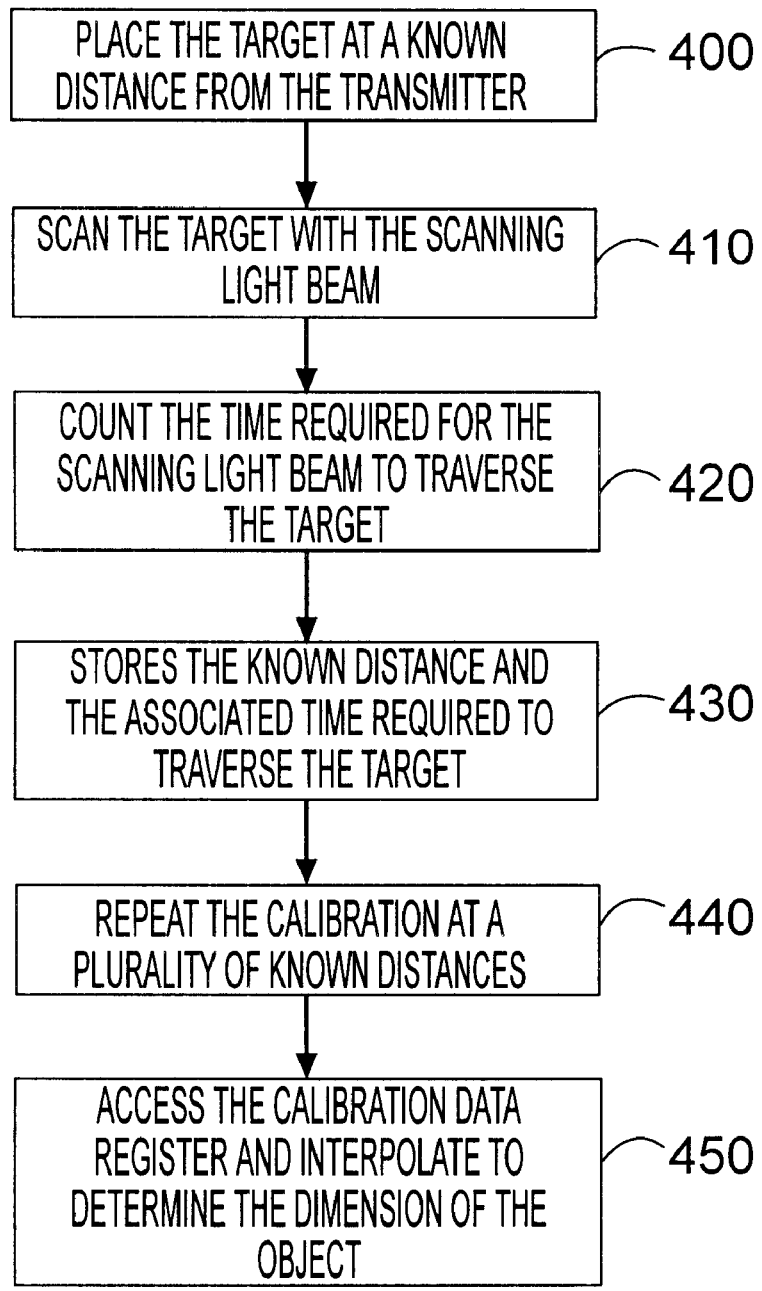
FIG. 6 is an operational block diagram of the operations performed by the apparatus in a calibration mode to calibrate the apparatus of the present invention according to one embodiment of the present invention.

To eliminate some of the errors associated with the use of the equation, some embodiments of the present invention may use a calibrated method of determining the dimension of the object. With reference to FIG. 6, to calibrate the apparatus of the present invention, a target having a known width is initially placed at a known distance from the transmitter. (See step 400). The apparatus, in a calibration mode, scans the target, (see step 410), and the counter counts the time required for the scanning light beam to traverse the target. (See step 420). The processor stores the known distance between the target and the transmitter and the associated accumulated counts for the time required for the scanning light beam to traverse the target in a calibration data register 60, see FIG. 2, in the memory device 36. (See step 430). This calibration process is repeated at a plurality of known distances, and the processor stores each of the measurements in the calibration data register. (See step 440).

In normal operation, when a measurement is made, the processor accesses the calibration data register, and using the number of counts from the measurement, interpolates between the values in the table to determine the dimension of the object. (See step 450). By using the calibrated data table as opposed to the equation, some of the errors associated with the apparatus (i.e., the difference between the rotational arc of the scanning light beam and the flat surface, component manufacturing tolerances, and component age drift) can be taken into account.

As discussed, the processor of this embodiment, interpolates between the values stored in the calibrated data table to determine the dimension of the object. It must be understood that any suitable interpolation method may be used. As one example of an interpolation method, in one embodiment of the present invention, the processor uses the following procedure to determine the dimension of the object base of the calibrated data table. As part of this example, Table 1 below illustrates a calibrated data table for an apparatus having a transmitter that transmits a scanning light beam at 8 $\pi$ radians/second and a target having eight black strips. This table includes the count values registered for various distance measurements.

TABLE 1

| Distance From Target (¼ inches) | Scan Width Count To Traverse Target |
| --- | --- |
| 48 | 22480 |
| 96 | 11397 |
| 144 | 7636 |
| 192 | 5740 |
| 240 | 4596 |

To illustrate the determination of the dimension of an object using this table, as an example, if the counter for a particular measurement accumulates a number of counts of 17108, the actual dimension of the object is calculated as shown below. First, the processor determines which of the calibrated distances that the measured count value falls between. In this example, the measured count value falls between 48 quarter inches and 96 quarter inches in the table. The processor next calculates the estimated value for the measurement by comparing the measured counts (i.e., 17108) to each of the 48 and 96 values. Specifically, the processor uses the equation below in which the measured counts is evaluated as a proportion of the calibration distances. As you will note, the ratio of the calibrated and measured counts is inverted, because as the distance lengthens, the number of counts decreases.

Distance$_X$=calibration distance*(calibration counts/measured counts)

or $D_{X\ at\ 48}$=48*(22480/17108)=63.07225 quarter inches $D_{X\ at\ 96}$=96*(11397/17108)=63.95324 quarter inches As can be seen, depending on whether the measured counts is compared to the value at 48 or at 96, somewhat different answers may appear (i.e., 63.07 and 63.95 quarter inches). To provide a more accurate answer, the processor weights the values to determine the measurement. Specifically, in this example, 63.07 and 63.95 quarter inches are much closer to 48 quarter inches than to 96 quarter inches. As such, the measurement should be weighted in favor of 48 inches. Instead of using the differences in percentage, the processor evaluates how far away each opposite measurement is from its baseline. If the measurement is far away, the processor uses the larger distance as a weight for the other measurement.

In this case,

Weight Factor(48)=96−64=32//How far away measurement is away from 96 quarter inches Weight Factor (96)=63−48=15//How far away measurement is away from 48 quarter inches The final calculated distance taking into account for the weighting of the values determined from the initial proportional ratio determination is:

$$D = \frac{\text{Weighted Value (48)} + \text{Weighted Value (96)}}{\text{Weight Factor (48)} + \text{Weight Factor (96)}}$$

or $D$=((32*63)+(15*64))/(32+15)

or $D$=63 quarter inches=15¾ inches.

As can be seen from this example, many different types interpolation schemes may be used for determining the dimension of the object. The interpolation scheme chosen for a particular embodiment is based on the desired processing time, acceptable errors, and operating curve of the apparatus.

As discussed above, the present invention provides a portable, convenient, and easy way to measure objects. In the embodiments discussed above, the apparatus of the present invention is illustrated as determining one dimension of an object. However, in some embodiments, it is advantageous to determine a length, width, and height of an object such that the volume of the object is known for shipping purposes. With reference to FIGS. 1, 3, and 5, in this embodiment of the present invention, the object comprises four points of interest, 14a, 14b, 14c, and 26, where the distance between points 14a and 26 define the width of the object, points 26 and 14b define the length of the object, and points 26 and 14c define the height of the object. In this embodiment of the present invention, either the target 12 or the transmitter 18 are systematically moved to each point of interest such that measurements of the length, width, and height of the object can be obtained, or alternatively, a separate target is placed at each of the points of interest. (See steps 170 and 290).

As each of the measurements are acquired, the processor stores the measurements in memory in a dimensions register 42. (See steps 180 and 300). These measurements are subsequently used by the processor for several operations including determination of shipment cost, auditing shipments, and for other shipment decisions.

For example, in one embodiment of the present invention, the processor uses the dimensions stored in the dimension register to determine either an area or a volume of the object. In this embodiment of the present invention, the processor accesses the dimensions register and retrieves the length, width, and height dimensions previously determined for the package. The processor next either determines an area of a side of the object using either L×W, W×H, or L×H, or determines the volume of the object using the equation L×W×H. (See steps 190 and 310).

As another example, some freight carrier companies determine a dimension weight for a package to be shipped. This dimension weight is a factor that accounts for not only the dimension of the package but also accounts for the possible weight of the package. The dimension weight is typically calculated by dividing the volume of the package by a density value. The density weight of the package is then used by the freight carrier for pricing, auditing, and shipping. As such, in one embodiment of the present invention, the processor determines the volume of the package and divides the volume by a predetermined density value to determine the dimension weight of the package.

Figure 7A:
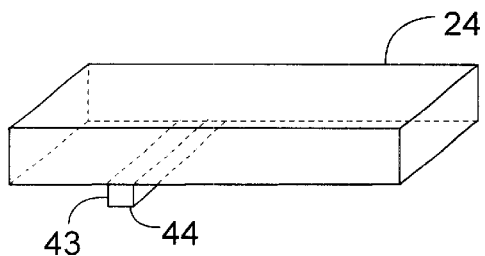
FIGS. 7A and 7B are three-dimensional block diagrams of the housing and reference point of the apparatus of the present invention according to two embodiments.
Figure 7B:
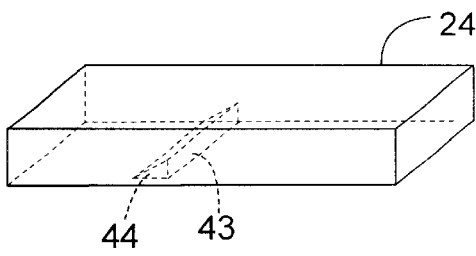

With reference to FIG. 1, as previously discussed, the transmitter and the receiver are typically placed in a housing for environmental protection and portability, although it is understood that the housing is not a requirement of the present invention. However, in instances where the transmitter and receiver are located in a housing, it is important in some embodiments to align the transmitter with the first point of interest of the object such that an accurate measurement can be made. As such, in some embodiments, it advantageous to provide a reference point 44 on the housing 24 that will engage the first point of interest on the object. The reference point may take many forms. For example, with reference to FIG. 7A, the reference point 44 is a protrusion extending from the housing that buts against the first point of interest. Additionally, with reference to FIG. 7B, the reference point 44 is a notch in the housing in which the first point of interest is inserted. Additionally, in instances where the object is nonuniform, the reference point may be a plumb bob system connected to the housing.

In some embodiments of the present invention that include a reference point 44 on the housing 24, there may be an offset distance between the position of the reference point and the position of the transmitter in the housing. For example, with reference to FIG. 1. the reference point 44 and the pivot point 46 for the axis of rotation of the scanning light beam output by the transmitter are separated by an offset distance 48, because the transmitter 18, not shown is located in the forward compartment of the housing. Because the pivot point 46 of the scanning light beam is offset from the first point of interest of the object, the measurement received from the processor will not accurately reflect the dimension of the object. As such, with reference to FIGS. 3 and 5, in one embodiment of the present invention, the processor, after determining the radius of the rotational arc 32, compensates the radius measurement for the offset distance to thereby provide an accurate dimension for the object. (See steps 160 and 280).

Although in the above embodiment of the present invention, the transmitter is illustrated in a forward compartment of the housing and the offset distance is added to the radius of the rotational arc, it must be understood that the transmitter may be located at any position in the housing and that the compensation of the dimensional measurement can be either additive or subtractive depending on the placement of the transmitter in relation to the reference point.

In addition to providing proper alignment of the transmitter with the first point of interest of the object, the reference point may also aid in positioning the scanning light beam relative to the target. Specifically, in some embodiments, it is advantageous for the scanning light beam to be positioned parallel to the edge of the object being measured and also perpendicular to the plane of the target. To align the scanning light beam and target, in some embodiments, the reference point includes a means of alignment. For instance, with reference to FIGS. 7A and 7B, the reference point includes plane 43 that engages the first point of interest of the object and maintains the scanning light beam perpendicular to the plane of the target.

As illustrated, the transmitter, processor, and various other components are typically located in the housing, however, it is understood that this in not a requirement. In instances in which the components are located in the housing, the housing includes securing means for holding the components. This securing means may take many forms including slots, connectors, glues, and fasteners.

As described above, the processor determines the dimension of the object such that the dimension can be used in further processing. In some embodiments, it is advantageous to display to the user the dimension of object. With reference to FIGS. 1 and 2, in one embodiment of the present invention, the apparatus 10 further includes a display 50 connected to the processor 22. In operation, after the processor has determined either the dimension of the object or the area or volume of the object, the processor outputs the dimension information to display.

Additionally, in some embodiments, it is advantageous to alert the user that the processor has determined either a dimension measurement or an area or volume calculation. This is important because the system is typically manually operated and the user requires assurance that a measurement has been made before moving the system to make another measurement. With reference to FIG. 2, in some embodiments, the apparatus 10 further includes an indicator 52 connected to the processor 22. In operation, after the processor has determined the dimension, area, or volume of the object, the processor causes the indicator to indicate to the user that the processor has completed processing.

As described above, the apparatus of the present invention includes several components for determining the dimensions of an object. Specifically, the apparatus of the present invention includes a transmitter that transmits a scanning light beam. It must be understood that any device that produces a scanning light beam that is rotated at an ascertainable angular velocity may be used in the apparatus of the present invention. For example, in one embodiment of the present invention, the transmitter is a model SE1200 transmitter available from Symbol Technology, located in Holtsville, N.Y. This model SE1200 transmitter has an angular velocity of rotation of approximately 8 π radians/second.

In addition, as discussed above, the transmitter transmits a scanning light beam. It must be understood that the transmitter may transmit any type of light beam including optical, laser, infrared, etc. Likewise, the receiver of the present invention may be any particular light sensor that is chosen to accommodate the type of scanning light beam transmitted by the transmitter.

As described above, the target of the present invention is used to provide a reflective signal to the receiver. The target of the present invention may assume several forms. For instance, in one embodiment, the target of the present invention may constitute a reflective surface that is of known width. In this embodiment, as the scanning light beam comes in contact with the edge of the target, the target will reflect the scanning light beam to the receiver. As the scanning light beam scans past the target, the target will no longer reflect the signal. By analyzing the period of the reflected signal with a counter or similar device, the time to scan the target can be obtained.

Figure 8A:
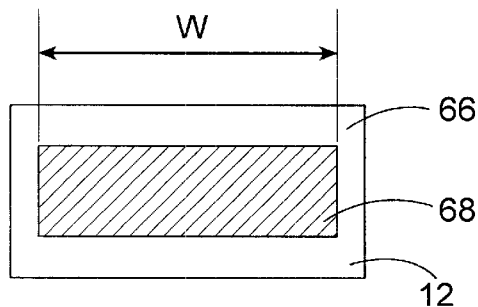
FIGS. 8A–8D are graphic illustrations of four types of targets according to four different embodiments of the present invention.

With reference to FIG. 8A, in addition to comprising a reflective surface 66, the target 12 may include a nonreflective surface 68 such as a black strip of known width W that is superimposed on a reflective backing. In this embodiment, as the beam comes in contact with the white backing of the target 66, the white backing will reflect the signal, however, when the beam contacts the edge of the black strip 68 of the target, the receiver will no longer receive a reflected signal. After, the scanning light beam has traversed the black strip, it will reach the edge of the black strip and the white background will again produce a reflected signal to the receiver. By analyzing the period of the absence of the reflected signal with a counter or similar device, the time to scan the target can be obtained.

Figure 8B:
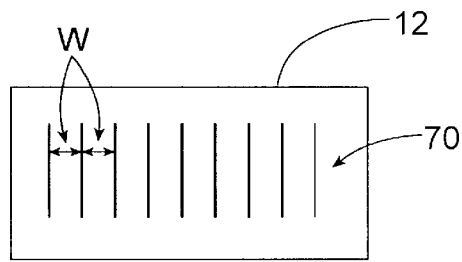

With reference to FIG. 8B, in another embodiment, the target comprises a plurality of blacks strips 70 separated by white strips of known widths W, or vice versa. This embodiment is advantageous as it allows the measurement system to take several measurements from one sweep of the scanning light beam. Specifically, each of the black strips divided by a white strip of known width constitutes a target. As the scanning light beam scans the target, the processor determines a dimension for the object based on the period of the reflective signal as the light reflects between each black strip. These individual measurements may vary somewhat due to changes in the angular velocity as the scanning light beam scans the target. As such, the processor may average all of the measurements together to provide an average dimension of the object.

Figure 8C:
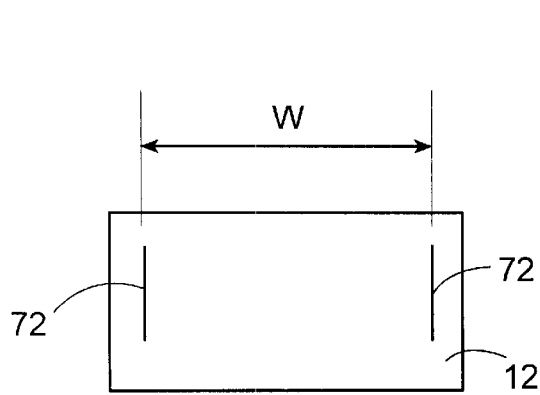
Figure 8D:
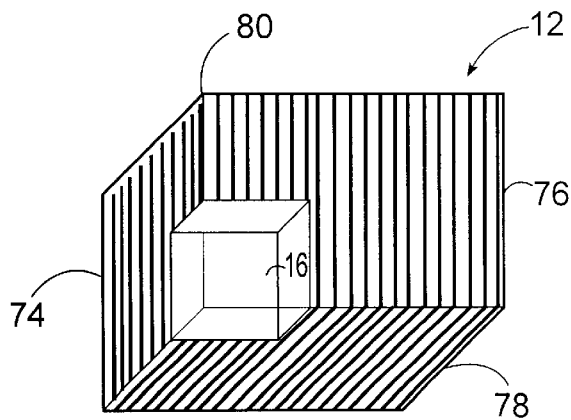

With reference to FIG. 8C, in still another embodiment, the target includes two reflectors 72 that are spaced apart at a known width W. In this embodiment, as the scanning light beam comes in contact with the first reflector, the target will reflect the scanning light beam to the receiver. As the scanning light beam scans across the second reflector, the target will again reflect the light signal to the detector. By analyzing the time between receipt of the reflected signals with a counter or similar device, the time to scan the target can be obtained:

With reference to FIG. 8D, in one embodiment, the target 12 may represent a measurement platform in which the object is placed for measurement. This platform may either be a stationary platform located at either the freight carrier's shipping center or customer's facility or a portable platform that can be carried to the customer's facility and quickly assembled to make measurements. The platform of this embodiment includes two sides, 74 and 76, and a bottom 78. The two sides of the platform intersect to form a corner 80.

Additionally, the target also includes a series of black strips separated by white spaces located on the two sides and bottom of the platform defining the target that is to be scanned.

In this particular embodiment, to measure an object, the object 16 is placed in the platform such that the corner of the object, and the edges of the object are flush with the corner and sides of the platform. The housing, including the transmitter, receiver, processor, and other components, is then systematically placed on the different points of interest on the object to make dimension measurements, and the sides and bottom of the platform are used as targets. Specifically, the transmitter is placed at a point of interest on the object and is directed toward either a side or bottom of the platform. The transmitter scans the black and white strips located on the platform and recognizes a predetermined number of black and white strips that appear directly in front of the transmitter. Using the time to scan each of these predetermined number of black and white strips, the processor determines the dimension of the object.

In this embodiment, the black and white strips may all be of uniform width, however, in some further embodiments, the widths of the individual strips may vary so as to define specific targets for the user to aim the transmitter. For instance, in one embodiment, black strips having larger widths may be spaced apart from each other by a number of black and white strips having uniform width that define targets. In this embodiment, the user aligns the transmitter such that the midpoint of the rotational arc of the scanning light beam is substantially centered between two of the black strips having larger widths and uses the black and white strips between the two larger width black strips as a target.

In addition to the configuration of the target, it must also be understood that the target may be of any particular size and may be placed in a housing or may be a freestanding unit. Specifically, the target may constitute a card that is held by the user or it may be a tag that is sown into the user's clothing such as a sleeve. Also, the target may be connected to the housing containing the transmitter by a chain or extendable arm.

Further, the target may also be designed such that the measurement device, in a target recognition mode, can ensure that the correct target is used for measurement. For instance, in one embodiment of the present invention, the target comprises a predetermined number of black strips and white spaces. In this embodiment, as the scanning light beam traverses the target, the processor evaluates the reflected signals from the target and determines the number of substantially constant values from the reflected signals. The processor next compares the number of substantially constant values to a stored target identification value. If the number of substantially constant values corresponds to the target identification value, the processor acknowledges that the correct target is being used. However, if the number of substantially constant values does not match the stored identification value for the target, the processor indicates either by the indicator or display that the wrong target has been used. In addition to the target being designed with a certain number of bars and white spaces, the target may alternatively have a number of black strips that are spaced apart in a pattern of defined modulation that provides target identification.

As discussed above, the present invention uses a processor for determining the dimension of the object. It must be understood that the processor may be any particular processor and in some instances may be a computer containing appropriate data processing software. Additionally, it must be understood that the display and indicator may be any particular device. For example, the display may be a light emitting diode (LED) array or a liquid crystal display (LCD). The indicator may be an icon on the display, a LED, or a speaker for creating an audible tone.

Further, it must be understood that although the apparatus of the present invention is illustrated as performing measurements on a package, that the term object should not be limited in such manner. The use of the term object is meant to incorporate many different size objects including rooms in houses, packages, plots of land, etc. Also, it must be understood that even though the points of interest on the object is illustrated as the corners of the object, that the points of interest may be anywhere on the box.

Also, it must be understood that although the apparatus of the present invention is illustrated as a stand-alone unit, the measurement apparatus may also be incorporated into a multifunctional device. For instance, the apparatus of the present invention may be incorporated into a general data collection system, that in addition to determining the dimensions of an object also collects other general data information.

In addition to providing an apparatus and method for determining the dimension of an object, the present invention also provides other apparatus and methods that aid in dimension measurement. Specifically, the present invention provides various features that allow the user to align the target and the transmitter prior to measurement, allow the measurement system to be calibrated, and determine when the measurement system is in steady state operation.

For example, one concern is the alignment of the target and the transmitter prior to performing a measurement on the object. To provide an accurate measurement of the object, in some embodiments, it is advantageous to align the center of the target with the transmitter. Specifically, with reference to FIG. 1, the target of this embodiment further includes a midpoint 54 on the first plane 30 of the target 12. Further, the transmitter transmits a scanning light beam 28 that is rotated and creates a scanning arc 56 having an arc midpoint 58. It is sometimes advantageous to align the midpoint of the target with the arc midpoint prior to determining the dimension of the object. As such, one embodiment of the present invention, provides an apparatus and method for aligning the target and transmitter.

Figure 9:
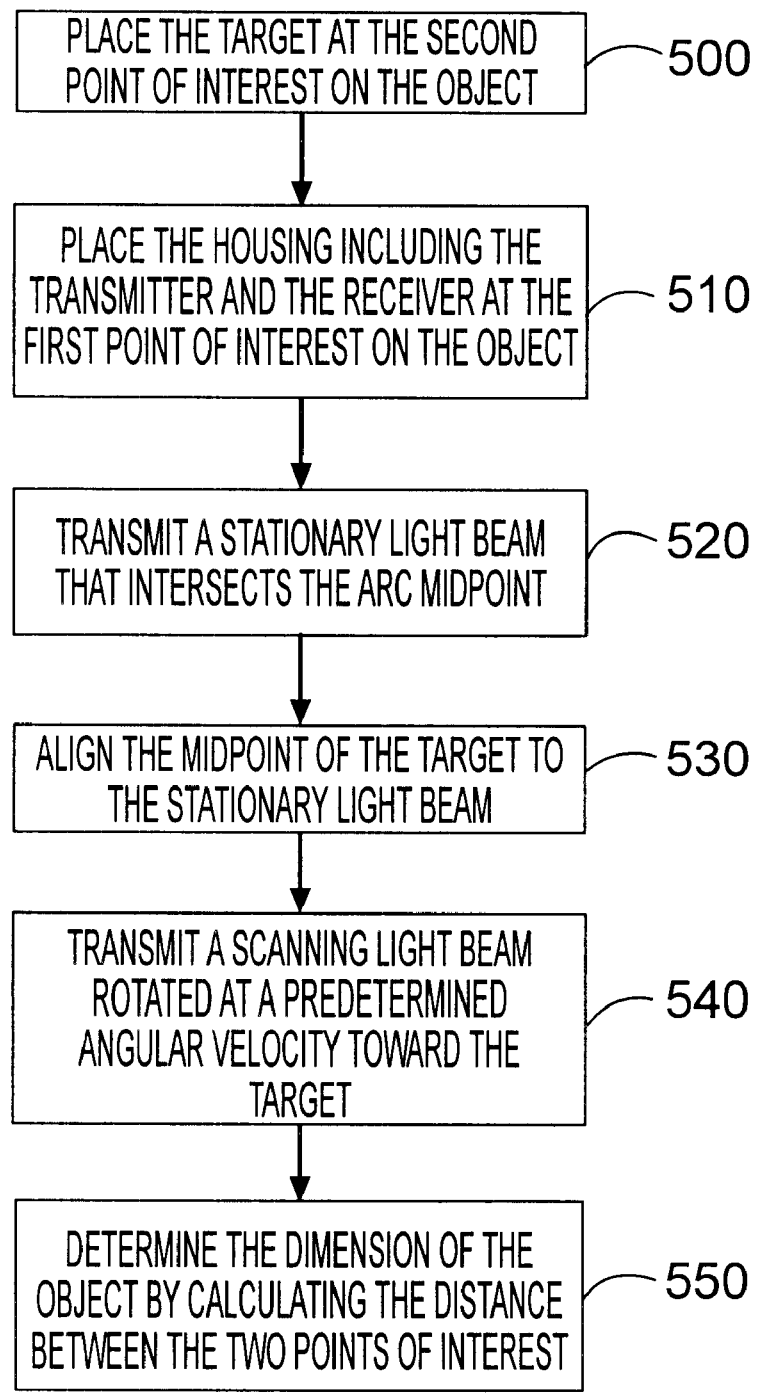
FIG. 9 is an operational block diagram of the operations performed by the apparatus in an alignment mode to align the transmitter and target according to one embodiment of the present invention.

Specifically, with reference to FIG. 9, in an alignment mode, the target is initially placed at the second point of interest on the object. (See step 500). The housing including the transmitter and the receiver are positioned at the first point of interest on the object. (See step 510). The transmitter is initially actuated and transmits a stationary light beam that intersects the arc midpoint. (See step 520). While the light beam is stationary, the user aligns the midpoint of the target to the stationary light beam. (See step 530). As such, the transmitter and target can be aligned prior to determining the dimensions of the object.

Although the transmitter of the present embodiment may be implemented such that the user can maintain the light beam in a stationary mode for a desired time interval, in some embodiments, it is advantageous for the transmitter to provide a stationary light beam for a predescribed time period and then transition into a scanning mode to perform the determination of the dimension of the object. As such, in one embodiment, after actuation, the transmitter initially transmits a stationary beam to allow the user to align the target, after which, the transmitter transmits a scanning light beam and performs a dimension measurement as described above. (See steps 540 and 550).

Figure 10:
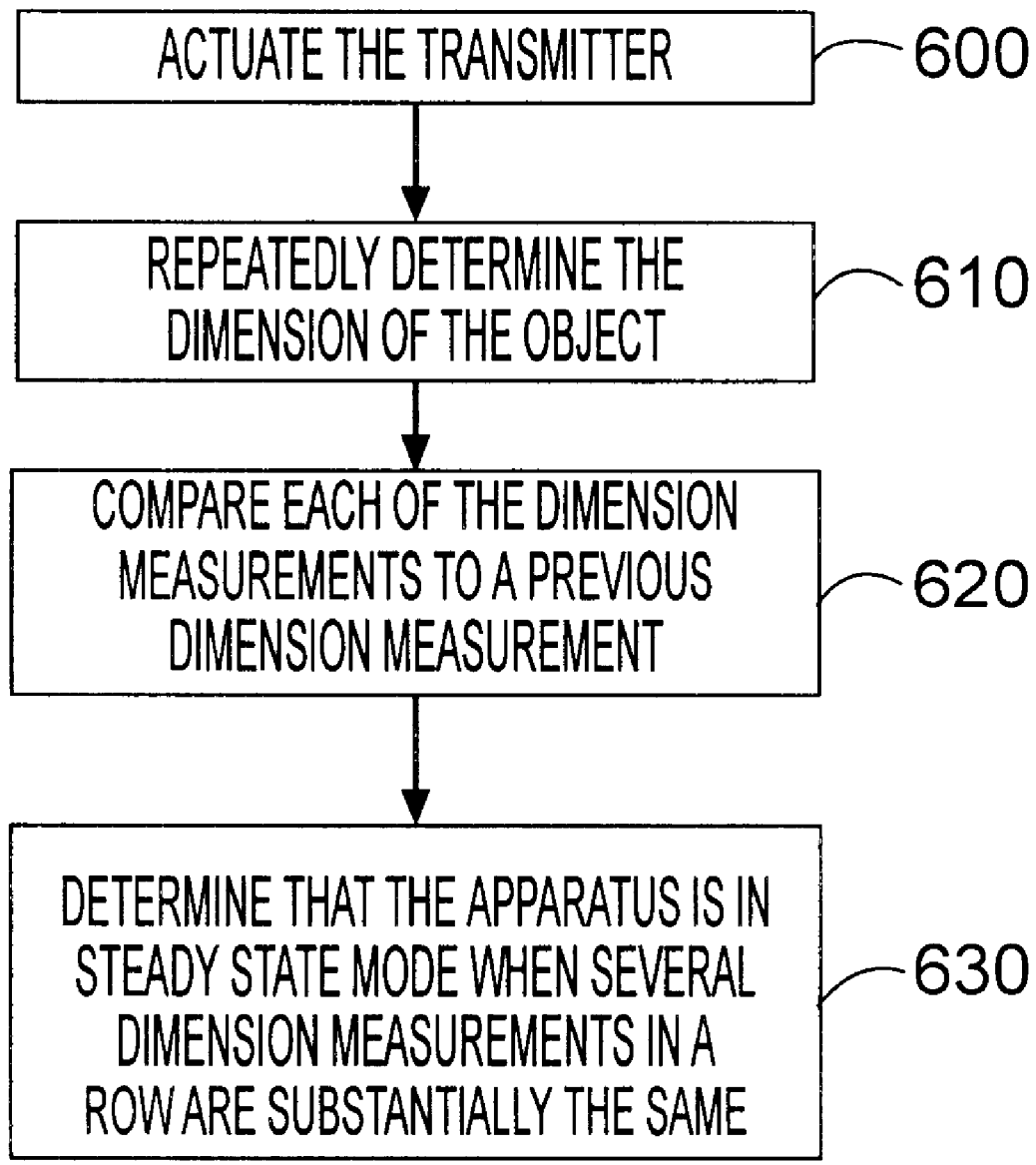
FIG. 10 is an operational block diagram of the operations performed by the apparatus in a steady state determination mode to determine when the apparatus of the present invention is operating in steady state according to one embodiment of the present invention.

As discussed above, the dimension of the object is determined using the angular velocity of the scanning light beam, and as such, it is advantageous that the scanning light beam is rotated at a substantially constant angular velocity prior to performing the measurement. Because the apparatus of the present invention is typically only activated when a measurement is to be made, it may require a brief delay before the transmitter transmits a scanning light beam rotated at a substantially constant angular velocity (i.e., steady state operation). As such, in one embodiment of the present invention the apparatus includes a steady state detection mode for determining if the apparatus is in steady state prior to determining the dimension of the object. With reference to FIG. 10, in this embodiment of the present invention, the transmitter is initially actuated to perform a measurement. (See step 600). As the scanning light beam from the transmitter scans the target, the processor repeatedly determines the dimension of the object. (See step 610). Additionally, the processor compares each of the dimension measurements to a previous dimension measurement. (See step 620). When several of the dimensions determined by the processor are substantially equal, the processor determines that the apparatus is in steady state mode and the apparatus enters a measurement mode. (See step 630). As an alternative, in one embodiment of the present invention, in order to reach a steady state mode, the processor may ignore a predetermined initial number of scans of the target to ensure that the apparatus is in steady state before determining the dimension of the object.

As discussed previously, the present invention provides a method and apparatus that calibrates the system to compensate for component manufacturing tolerance, age drift, and differences between the flat plane of the target and the rotational arc. In addition to these sources of error, other factors such as component operating temperature drift may also affect the performance of components. Specifically, as the operating temperature of the various components of the apparatus change, the operating parameters of the components may also change. As such, in some embodiments, it is advantageous to calibrate the measurement system to ensure that the measurement system provides accurate determinations of the dimensions of objects.

Figure 11:
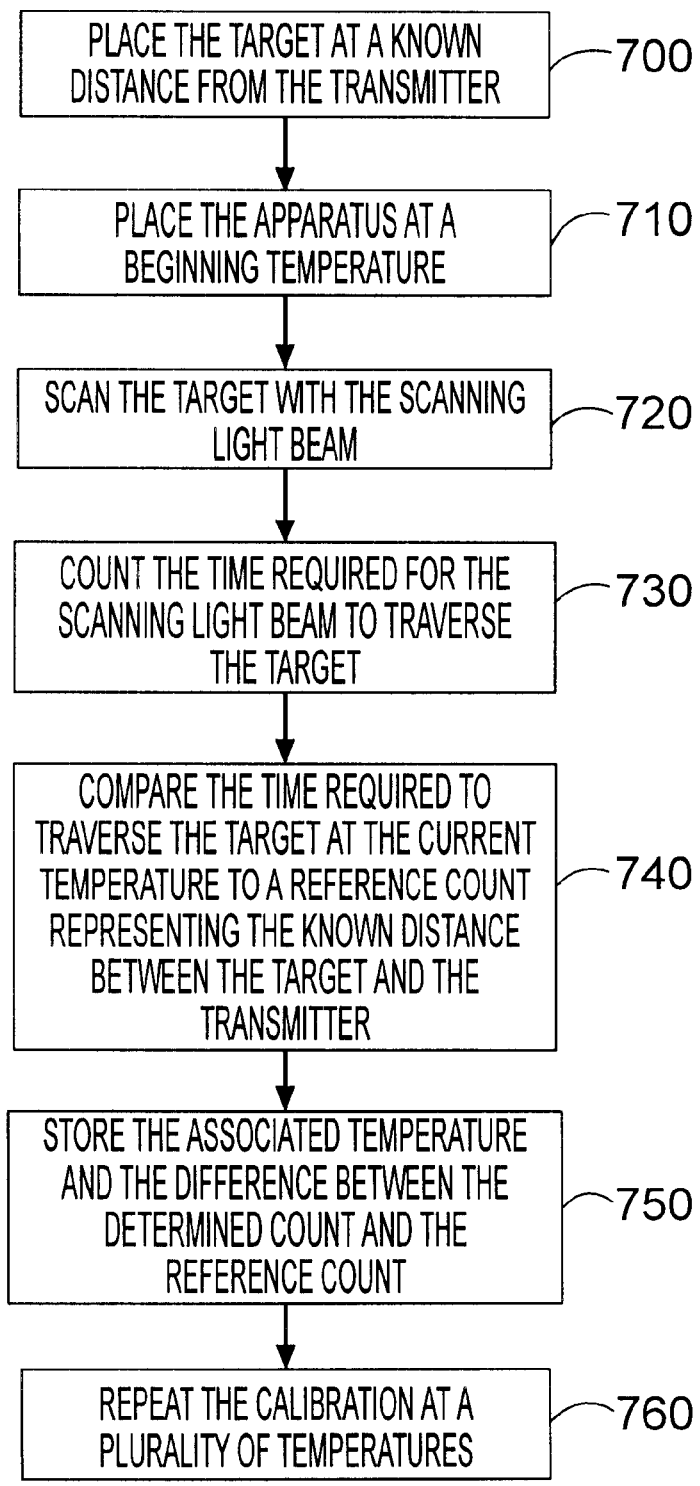
FIG. 11 is an operational block diagram of the operations performed by the apparatus in a temperature calibration mode to calibrate the apparatus of the present invention according to one embodiment of the present invention.

With reference to FIG. 2, to compensate for temperature component drift, in one embodiment of the present invention, the apparatus further includes a temperature sensor 62 connected to the processor 22 for measuring the operating temperature in the apparatus. With reference to FIG. 11, to calibrate the apparatus, the transmitter and the target are initially placed at a known distance apart. (See step 700). The apparatus is placed at a beginning temperature and allowed to reach steady state. (See step 710). The apparatus scans the target, (see step 720), and the counter counts the time required for the scanning light beam to traverse the target. (See step 730). The processor compares the time required for the scanning light beam to traverse the target at the current operating temperature to a reference count that represents the known distance between the target and the transmitter. (See step 740). The processor stores the operating temperature from the sensor and also stores the difference between the measured count value and the reference count value in a temperature calibration register 64, see FIG. 2, in the memory device 36. (See step 750). This calibration process is repeated at a plurality of temperatures, and the processor stores each of the measurements in the calibration data register. (See step 760).

In normal operation, after the apparatus has been calibrated, the processor determines the time required for the scanning light beam to traverse the target. Additionally, the processor receives the current operating temperature from the sensor. Using the operating temperature, the processor accesses the temperature calibration register of the memory device, retrieves the calibration value at the operating temperature and adjusts the dimension measurement appropriately.

In other embodiments of the present invention, it may be advantageous to incorporate the temperature compensation table along with the calibration table used to compensate for component manufacturing tolerance, component aging, and differences in the plane of the target and the rotational arc. As such, in one embodiment of the present invention, the apparatus in a calibration mode is placed at a beginning temperature, and the processor creates a table of different calibrated distances for that temperature and stores the distances between the target and the transmitter and the time required for the scanning light beam to traverse the target at that temperature. This calibration process is repeated at a plurality of temperatures, and the processor stores each of the measurements in the calibration data register.

In normal operation, the processor initially receives the operating temperature from the temperature sensor and based on this operating temperature accesses the temperature calibration table corresponding to the operating temperature. The processor next interpolates between the values in the table to determine the dimension of the object. As such, in this embodiment, the apparatus of the present invention compensates for component manufacturing tolerance, component aging, and differences in the plane of the target and the rotational arc.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for measuring a volume of an object as represented by different dimensions of the object defined by the distance between two points of interest at different locations on the object, wherein said apparatus comprises:

a transmitter positioned at a first point of interest, wherein said transmitter produces a scanning light beam rotated at a predetermined angular velocity;

a target for positioning at different points of interest on the object, wherein at least a portion of said target defines a first plane, and wherein at least a portion of said target along the first plane reflects the scanning light beam as the scanning light beam traverses the first plane of said target;

a receiver positioned at the first point of interest, wherein said receiver receives a reflected light beam reflected by the first plane of said target; and a processor in electrical communication with said receiver, wherein as said target is placed at different points of interest on said object such that the first point of interest and the different points of interest respectively define the width height, and length of the object said processor determines the width, height, and length of the object by calculating the distance between the first point of interest and the different points of interest, and wherein said processor multiplies the width, height, and length together to thereby determine the volume of the object.

2. An apparatus according to claim 1, wherein the first plane of said target has a known width, wherein said processor further comprises a counter in electrical communication with said receiver, and wherein said counter accumulates the time required for the scanning light beam to traverse the known width of the first plane of said target.

3. An apparatus according to claim 1, wherein the first plane of said target has a known width, and wherein said processor determines the dimension of the object defined by the distance between said transmitter and said target based on the known width of the first plane of said target, the angular velocity at which said transmitter rotates the scanning light beam, and the time required for the scanning light beam to traverse the known width of the first plane of said target.

4. An apparatus according to claim 1, wherein said transmitter transmits a scanning laser beam.

5. An apparatus according to claim 1, wherein said transmitter rotates the light beam through a rotational arc.

6. An apparatus according to claim 5, wherein the first plane of said target is aligned with said transmitter such that a light beam intersecting a midpoint of the rotational arc is substantially perpendicular to the first plane of said target.

7. An apparatus according to claim 6, wherein the first plane of said target has a known width and a midpoint, and wherein the midpoint of said target is substantially aligned with a light beam intersecting the midpoint of the rotational arc.

8. An apparatus according to claim 5, wherein the first plane of said target has a known width and a midpoint, wherein said transmitter in an alignment mode provides a stationary light beam that intersects the midpoint of the rotational arc such that the midpoint of said target can be aligned to the stationary light beam to thereby align said target and said transmitter.

9. An apparatus according to claim 1, wherein said target comprises at least two reflective transition points spaced apart at a known distance, wherein the scanning light beam traverses across the reflective transition points, and wherein said receiver receives signals indicating when the scanning light beam traverses the reflective transition points.

10. An apparatus according to claim 9, wherein the reflective transition points of said target comprise a plurality of nonreflective portions spaced apart from each other by reflective portions having known widths such that each nonreflective portion separated by a reflective portion of known width defines a target.

11. An apparatus according to claim 10, wherein as the scanning light beam traverses across each of the plurality of reflective portions of said target, said receiver receives a respective reflected light beam associated with each of the plurality of reflective portions, wherein said processor determines a respective distance between the first point of interest and the point of interest where said target is located based on each of the reflected signals from each of the reflective portions of said target, and wherein said processor averages these determined respective distances together to determine an average distance between the first point of interest where said transmitter and receiver are located and the point of interest at which said target is located.

12. An apparatus according to claim 1, wherein said target comprises a reflective portion and a nonreflective portion having a known width, wherein the scanning light beam traverses across the target and the receiver receives signals indicating when the scanning light beam traverses from the reflective portion to the nonreflective portion and when the scanning light beam traverses from the nonreflective portion to the reflective portion of said target.

13. An apparatus according to claim 1 further comprising a display electrically connected to said processor, wherein said display receives and displays the determined dimension of the object.

14. An apparatus according to claim 1 further comprising an indicator electrically connected to said processor, wherein said indicator indicates to a user when said processor has determined the dimension of the object.

15. An apparatus according to claim 1, wherein said target is positioned at a known distance from said transmitter, wherein said transmitter in a calibration mode scans said target with the scanning light beam, wherein said receiver receives a reflected signal from said target, and wherein said processor determines the time required for said transmitter to scan said target for the known distance between said target and transmitter and stores the time and known distance in a calibration table.

16. An apparatus according to claim 15, wherein said target is systematically placed at differing known distances from said transmitter, wherein said processor determines a time required for the scanning light beam to traverse the target at each of the differing known distances and stores the time and known distance in a calibration table.

17. An apparatus according to claim 1, wherein said processor in a steady state determination mode repeatedly calculates the distance between the two points of interest and compares the calculated distances to thereby determine when said transmitter produces a scanning light beam rotated at a predetermined angular velocity thereby indicating that the transmitter is operating in a steady state mode.

18. An apparatus according to claim 1 further comprising a sensor connected to said processor for sensing the operating temperature of said apparatus and a memory device.

19. An apparatus according to claim 18, wherein said memory device contains a stored table of calibration data, and wherein said processor compensates for the calculated dimension of the object based on the operating temperature of the apparatus and the table of calibration data.

20. An apparatus according to claim 17, wherein said apparatus is at a predetermined temperature, wherein said target is positioned at a known distance from said transmitter, wherein said transmitter in a temperature calibration mode scans said target with the scanning light beam, wherein said receiver receives a reflected signal from said target, and wherein said processor determines the time required for said transmitter to scan said target for the known distance between said target and transmitter and stores the time, temperature, and known distance in a calibration table.

21. An apparatus according to claim 1 further comprising a memory device. wherein said processor stores the dimension of the object in said memory device.

22. An apparatus according to claim 1 further comprising a housing having securing means for housing the transmitter and receiver and a reference point located on an external portion of said housing, wherein the reference point engages the first point of interest of the object and is a defined distance from said transmitter, and wherein said processor compensates for the distance between the reference point and said transmitter in determining the dimension of the object.

23. A method for measuring a volume of an object as represented by different dimensions of the object defined by the distance between two points of interest at different locations on the object, wherein said method comprises the steps of:

transmitting a scanning light beam rotated at a predetermined angular velocity from a first point of interest;

systematically positioning a target at different points of interest on the object such that the first point of interest and the different points of interest respectively define the width, height, and length of the object, wherein at least a portion of said target defines a first plane for reflecting the scanning light beam;

at least partially reflecting the scanning light beam as the scanning light beam traverses the first plane of the target at each different point of interest on the object;

receiving at the first point of interest a reflected light beam reflected by the first plane of the target as the target is placed at each different point of interest on the object;

determining the width, height, and length of the object by calculating the distance between the first point of interest and the different points of interest; and multiplying the width, height, and length to thereby determine the volume of the object.

24. A method according to claim 23, wherein the first plane of said target has a known width, and wherein said method further comprises the step of counting the time required for the scanning light beam to traverse the known width of the first plane of the target.

25. A method according to claim 23, wherein the first plane of said target has a known width, and wherein said determining step comprising determining the dimension of the object based on the known width of the first plane of the target, the angular velocity at which the scanning light beam is rotated, and the time required for the scanning light beam to traverse the known width of the first plane of the target.

26. A method according to claim 23, wherein said transmitting step comprises transmitting a scanning laser beam.

27. A method according to claim 23, wherein said transmitting step comprises rotating the light beam through a rotational arc.

28. A method according to claim 27 further comprising the step of aligning the first plane of the target with the transmitter such that a light beam intersecting a midpoint of the rotational arc is substantially perpendicular to the first plane of the target.

29. A method according to claim 28, wherein the first plane of the target has a known width and a midpoint, and wherein said aligning step comprises substantially aligning the midpoint of the target with a light beam intersecting the midpoint of the rotational arc.

30. A method according to claim 27, wherein the first plane of the target has a known width and a midpoint, wherein said transmitting step in an alignment mode comprises transmitting a stationary light beam that intersects the midpoint of the rotational arc, and wherein said aligning step comprises aligning the midpoint of the target to the stationary light beam to thereby align the target and the transmitter.

31. A method according to claim 23, wherein the target includes at least two reflective transition points spaced apart at a known distance, wherein said transmitting step comprises transmitting a scanning light beam that traverses across the reflective transition points, and wherein said reflecting step comprising reflecting the scanning light beam as it traverses the reflective transition points.

32. An apparatus according to claim 31, wherein the reflective transition points of the target comprises a plurality of nonreflective portions spaced apart from each other by reflective portions having known widths such that each nonreflective portion is separated by a reflective portion of known width defines a target, wherein as the scanning light beam traverses across each of the plurality of reflective portions of the target, said receiving step receives a respective reflected light beam associated with each of the plurality of reflective portions, wherein said determining step determines a respective distance between the first point of interest and the point of interest where the target is located based on each of the reflected signals from each of the reflective portions of the target, and wherein said determining step averages these determined respective distances together to determine an average distance between the first point of interest and the point of interest at which the target is located.

33. A method according to claim 23, wherein said target comprises a reflective portion and a nonreflective portion having a known width, wherein said transmitting step comprises transmitting a scanning light beam that traverses across the target, and wherein said reflecting step comprises reflecting signals indicating when the scanning light beam traverses from the reflective portion to the nonreflective portion and when the scanning light beam traverses from the nonreflective portion to the reflective portion of the target.

34. A method according to claim 23 further comprising the step of displaying the determined dimension of the object determined in said determining step.

35. A method according to claim 23 further comprising the step of indicating to a user when said determining step determines the dimension of the object.

36. A method according to claim 23 further comprising the step of placing the transmitter and target at a known distance apart, wherein said transmitting step in a calibration mode comprises transmitting a scanning light beam at the target, wherein said reflecting step comprises reflecting a reflected signal, wherein said receiving step comprises receiving the reflected signal, and wherein said determining step comprises determining the time required for the scanning light beam to scan the target for the known distance.

37. A method according to claim 36, wherein said placing step comprises systematically placing the transmitter and target at different known distances, wherein said determining step comprises determining the time required for the scanning light beam to scan the target for each of the known distances, and wherein said method further comprises storing the time required for the scanning light beam to scan the target and the known distances in a table.

38. A method according to claim 23, wherein said determining step in a steady state determination mode comprises repeatedly determining the distance between the two points of interest, and wherein said method further comprises the step of comparing the distances determined in said determining step to thereby determine when the transmitting step produces a scanning light beam rotated at a predetermined angular velocity.

39. A method according to claim 23 further comprising sensing the operating temperature at which the scanning light beam is transmitted.

40. A method according to claim 39 further comprising storing a table of temperature calibration data, and wherein said method further comprises after said determining step the step of compensating the determined dimension of the object from said determining step based on the operating temperature scanning laser beam and the table of calibration data.

41. A method according to claim 39 further comprising the step of placing the apparatus at a predetermined temperature and placing the target at a known distance from the transmitter, wherein said transmitting step transmits a scanning light beam at said target, wherein said receiving step receives a reflected signal from the target, wherein said determining step determines the time required for said transmitter to scan the target for the known distance between the target and transmitter, and wherein said method further comprising storing the time, temperature, and known distance in a calibration table.

42. A method according to claim 23 further comprising after said determining step the step of storing the dimension of the object.

43. A method according to claim 23 wherein said transmitting step comprises transmitting a scanning light beam from an offset point located at a known reference distance from the first point of interest, and wherein said method further comprises the step of compensating the dimension of the object determined in said determining step for the known reference distance between the offset point and the first point of interest.

* * * * *

UNITED STATES PATENT AND TRADEMARK OFFICE
CERTIFICATE OF CORRECTION

PATENT NO.     : 6,373,579 B1
DATED          : April 16, 2002
INVENTOR(S)    : Ober et al.

It is certified that error appears in the above-identified patent and that said Letters Patent is hereby corrected as shown below:

Title page, Item [54] and Column 1, line 2,
Title, "DETERMINGING" should read -- DETERMINING --.

Item [56], References Cited, U.S. PATENT DOCUMENTS, insert the following:
-- 6,260,001     7/2001          Bengala --.

Signed and Sealed this

Twenty-fourth Day of September, 2002

Attest:

Attesting Officer

JAMES E. ROGAN
*Director of the United States Patent and Trademark Office*